Patented Dec. 28, 1926.

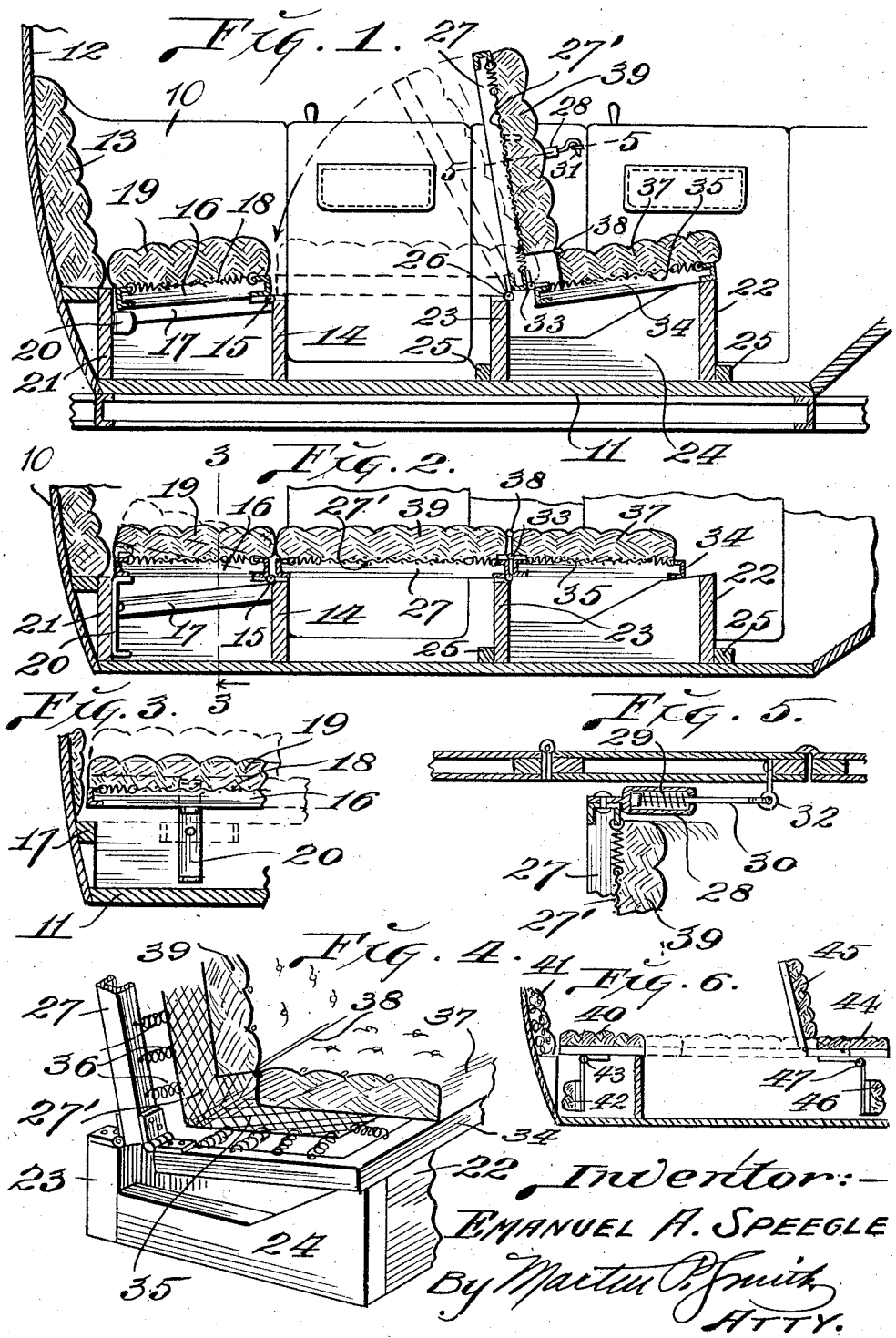

1,612,161

UNITED STATES PATENT OFFICE.

EMANUEL A. SPEEGLE, OF LOS ANGELES, CALIFORNIA.

CONVERTIBLE SEAT BED FOR MOTOR VEHICLES.

Application filed September 18, 1924. Serial No. 738,423.

My invention relates generally to automobiles, and more particularly to the seats thereof, the principal object of my invention being to construct the front and rear seats of an automobile so that the same may be readily shifted into position to form a convenient and comfortable bed.

Further objects of my invention are to provide a comfortable seat-bed structure for automobiles that may be readily shifted from one position to another; to construct the seat frames so that when shifted into position to form a bed bottom the cushioned portions of the seats will all occupy a horizontal plane, thereby providing a comfortable and convenient bed bottom; to provide simple and efficient means whereby parts of the seat structures may be adjusted into different positions for the convenience and comfort of the occupants of the vehicle; and, further, to provide in a structure of the character referred to a front seat and frame therefor that may be bodily removed from the vehicle and used as a seat at a camp or stopping place or as a table for the support of food and refreshments.

With the foregoing and other objects in view, my invention consists in the features of construction and combination and arrangement of parts hereinafter more fully described and claimed, reference being had to the accompanying drawings, in which—

Figure 1 is a vertical section taken lengthwise through the central portion of the body of an automobile, showing the same equipped with my improved comfortable seats;

Figure 2 is a sectional view similar to Figure 1, showing the seat structures shifted into position to form a bed bottom;

Figure 3 is a section taken approximately on the line 3—3 of Figure 2;

Figure 4 is a perspective view, with parts broken away and in section, of the end portion of the front seat structure;

Figure 5 is an enlarged horizontal section taken approximately on the line 5—5 of Figure 1;

Figure 6 is a vertical section taken lengthwise through the central portion of a motor vehicle body and showing a modified arrangement of my improved convertible seat bed.

Referring by numerals to the accompanying drawings, 10 designates the upper portion of the frame or chassis of an automobile, 11 the floor of the automobile body, 12 the rear wall of the body, and 13 the back cushion of the rear seat.

Resting upon the floor 11 of the vehicle body a suitable distance in front of the back 12 is a transversely disposed panel 14, and connected to the upper end thereof by suitable hinges 15 is the front edge of a rear seat frame 16 that is preferably formed of channel iron, and the end rails of which are adapted to normally rest on side cleats or ledges 17 that are secured to the sides of the vehicle body between panel 14 and the back 12. These supporting cleats are preferably inclined so that under normal conditions the rear seat and its cushion gradually decline toward the lower portion of the rear seat back cushion 13, thus affording comfort and convenience to the occupants of the rear seat. Arranged in the upper portion of the rear seat frame 16 is a section 18, preferably of flexible resilient material, such as woven wire, and supported in any suitable manner upon this flexible resilient section and upon the seat frame 16 is a rear seat cushion 19.

The rear portion of the rear seat and its cushion is adapted to be supported at different elevations by brackets or turn buttons 20 that are pivoted off center upon a panel 21 that is arranged beneath the cushion 13 and the ends of which turn buttons are bent forwardly so as to provide supports for the rear rail of frame 16. When frame 16 is in its lowermost and inclined position, as illustrated in Figure 1, and with its ends resting on the ledges 17, these turn buttons 20 occupy horizontal positions, and when it is desired to support the rear portion of the seat frame 16 so that the latter occupies a horizontal plane, said turn buttons are shifted into vertical positions, as illustrated in Figures 2 and 3, with the short ends of said turn buttons above their pivotal points. By completely reversing the turn buttons or shifting the same so that their longer ends are disposed above their pivotal points, then the rear end of the seat frame 16 and the cushion thereon will be elevated slightly with respect to their front ends so as to provide a pillow effect, as illustrated by dotted lines in Figure 2.

The front seat structure includes a substantially rectangular base frame that is composed of front and rear members 22 and 23, respectively, and end members 24, all of which members may be formed of wood or metal, as desired, and the frame thus formed is removably positioned on the floor 11 of the vehicle body between transversely disposed strips 25. Connected by suitable hinges, such as 26, to the upper front corner of rear frame member 23 is the lower rear corner of a seat back frame 27 that is preferably formed of channel iron, and in which is arranged a section 27' of flexible resilient material, preferably woven wire. Pivotally connected to the side members of frame 27 are the rear ends of short tubular housings 28 within which are arranged expansive coil springs, such as 29, and supported by each coil spring is a rod, such as 30, the outer end of which is provided with a hook, such as 31. These hooks are adapted to be engaged in loops or eyes, such as 32, that are secured to the side walls of the vehicle body between the front and rear doors. There are two of these loops or eyes on each side of the vehicle body, so that the front seat back frame may be yieldingly supported in a substantially upright position, as illustrated by solid lines in Figure 1, or it may be maintained in a tilted back position, as illustrated by dotted lines in Figure 1. Connected by hinges, such as 33, to the lower front corner of frame 26 is a front seat frame 34, preferably formed of channel iron, and arranged therein is a section 35 of flexible resilient material, such as woven wire.

In some instances it may be found desirable to form the flexible resilient sections 27' and 35 in a single piece, and to connect the edges thereof to the seat frame members 26 and 34 by short coil springs, such as 36. Arranged on the front seat frame 34 and supported by the resilient member 35 is a suitable cushion 37, and the upper rear edge thereof is connected by a flexible joint, such as 38, to the lower front edge of a cushion 39 that is supported by front seat back frame 26 and the resilient member 27" that is carried thereby.

Under normal conditions, or while the front seat is arranged as a seat for the accommodation of the driver of the car, the front edge of seat frame 34 rests on the upper edge of front wall member 22 of the seat base, as illustrated in Figure 1, and the front seat back occupies a slightly inclined position, as illustrated in Figure 1, with the spring-supported hooks 31 engaged in the forward pair of eyes or loops 32.

When the convertible front seat is shifted into position to cooperate with the rear seat and its cushion in forming a bed bottom, hooks 31 are disengaged from the eyes 32 and front seat back 26 and its cushion are swung rearwardly and downwardly into a horizontal plane, as illustrated in Figure 2, and when so positioned the rear edge of front seat back frame 26 rests on top of end members 24, and with the rear edge of cushion 39 positioned directly against the front edge of rear seat cushion 19. When the front seat back is thus swung downward into a horizontal plane, the rear portion of front seat frame 34 will be slightly elevated, due to the arrangement of the hinges 33 that connect the frames 26 and 34, and the front seat frame 34 will assume a horizontal plane in alinement with frames 16 and 26, and the rear edge of front seat cushion 37 will abut the front edge of the front seat back cushion 39 (see Figure 2). Thus all the frames and cushions of the convertible structures are brought into a horizontal plane to form a bed bottom that may be used for sleeping purposes by the occupants of the car, and the comfort and convenience of the converted structure may be enhanced by raising the rear portion of frame 16 and cushion 19, as illustrated by dotted lines in Figure 2.

If desired, the front seat and its supporting frame may be bodily removed from the car and placed on the ground to provide a low seat or a table from which refreshments may be served.

Obviously the front seat supporting frame may be rigidly fixed within the car body, and when this is done I prefer to arrange suitable brackets between the rear member 23 and the side walls of the car body between the doors thereof.

In the modified construction illustrated in Figure 6, rear seat 40 is mounted so as to slide bodily forwardly a short distance, and when so moved the space between the rear edge of said rear seat and the lower portion of the rear seat back 41 is filled by a narrow seat member 42 that is connected by hinges such as 43 to the under side of rear seat 40 and which section 42 is arranged to swing from its normal vertical position beneath the rear seat into the same horizontal plane with said rear seat when a bed bottom is provided. In this modified structure, front seat 44 is arranged to slide bodily in a rearward direction and front seat back 45 is hinged so that it may swing downwardly into the same horizontal plane with back seat 40 and front seat 44, and when the parts are so arranged a narrow section 46 that is connected by hinges such as 47 to the under side of front seat 44 is swung upward into the same horizontal plane with the parts 40, 44 and 45, thereby providing a bed bottom of ample length.

The construction just described is particularly applicable for automobiles having relatively long bodies, and wherein the seats are spaced a considerable distance apart.

Thus it will be seen that I have provided a relatively simple, practical, and readily convertible seating arrangement for motor vehicles that is capable of being used as convenient and comfortable seats for the occupants of the vehicle or as a practically continuous-cushioned bed bottom, the head portion of the latter capable of being tilted to provide a pillow effect.

It will be understood that various minor changes in the size, form and construction of my improved convertible seating arrangement for motor vehicles may be made without departing from the spirit of my invention, the scope of which is set forth in the appended claims.

I claim as my invention:

1. The combination with a motor vehicle, of spaced strips transversely arranged on the front portion of the floor of the vehicle body, a front seat base frame removably arranged on the floor of the vehicle body between said strips, a front seat back frame hinged at its lower edge to the rear portion of the front seat base frame and adapted to be swung downward into a horizontal position to bridge the space between the front seat base frame and rear seat base frame, a front seat frame hinged to the lower forward corner of the front seat back frame, said front seat frame being supported by and arranged to slide freely backwardly and forwardly upon said front seat base frame, cushions carried by the front seat back frame and front seat frame and the lower front edge of the front seat back frame cushions being flexibly connected to the upper rear edge of the front seat frame cushion.

2. The combination with a motor vehicle, of spaced strips transversely arranged on the front portion of the floor of the vehicle body, a front seat base frame removably arranged on the floor of the vehicle body between said strips, a front seat back frame hinged at its lower edge to the rear portion of the front seat base frame and adapted to be swung downward into a horizontal position to bridge the space between the front seat base frame and rear seat base frame, a front seat frame hinged to the lower forward corner of the front seat back frame, said front seat frame being supported by and arranged to slide freely backwardly and forwardly upon said front seat base frame, cushions carried by the front seat back frame and front seat frame, the lower front edge of the front seat back frame cushion being flexibly connected to the upper rear edge of the front seat frame cushion and spring-held hooks pivotally connected to the ends of the front seat back frame and adapted to be connected to the side walls of the vehicle body.

In testimony whereof I affix my signature.

EMANUEL A. SPEEGLE.